United States Patent
Shiiyama et al.

(10) Patent No.: US 10,759,299 B2
(45) Date of Patent: Sep. 1, 2020

(54) MANAGEMENT DEVICE, MANAGEMENT SYSTEM, AND COMPUTER-READABLE STORAGE MEDIUM

(71) Applicant: HONDA MOTOR CO., LTD., Tokyo (JP)

(72) Inventors: Takumi Shiiyama, Saitama (JP); Ryo Oshima, Saitama (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/559,633

(22) Filed: Sep. 4, 2019

(65) Prior Publication Data
US 2019/0389325 A1    Dec. 26, 2019

Related U.S. Application Data

(63) Continuation of application No. PCT/JP2018/011642, filed on Mar. 23, 2018.

(30) Foreign Application Priority Data

Mar. 23, 2017   (JP) ................. 2017-057892

(51) Int. Cl.
*B60L 53/65* (2019.01)
*B60S 5/06* (2019.01)
(Continued)

(52) U.S. Cl.
CPC ............ *B60L 53/65* (2019.02); *B60L 53/80* (2019.02); *B60S 5/06* (2013.01); *H04L 67/12* (2013.01); *H04W 4/40* (2018.02)

(58) Field of Classification Search
USPC ..................................... 701/29.3
See application file for complete search history.

(56) References Cited

U.S. PATENT DOCUMENTS 10,055,911 B2   8/2018   Luke
10,065,525 B2   9/2018   Chen
(Continued)

FOREIGN PATENT DOCUMENTS

JP   H1198699 A    4/1999
JP   H11150809 A   6/1999
(Continued)

OTHER PUBLICATIONS

International Search Report and (ISA/237) Written Opinion of the International Search Authority for International Patent Application No. PCT/JP2018/011642, issued/mailed by the Japan Patent Office dated Jun. 19, 2018.

(Continued)

*Primary Examiner* — Tyler D Paige

(57) ABSTRACT

A management device is a management device that: manages batteries; receives a first battery; and supplies a second battery. The management device includes an obtaining portion that obtains, from the first battery, first identification information stored in the first battery. The management device includes an authenticating portion that authenticates a user of the first battery by using the first identification information the obtaining portion has obtained. The management device includes a writing portion that, if the authenticating portion authenticates the user, writes the first identification information to the second battery that is to be supplied to the user.

7 Claims, 6 Drawing Sheets

(51) Int. Cl.
*H04W 4/40* (2018.01)
*B60L 53/80* (2019.01)
*H04L 29/08* (2006.01)

(56) References Cited

U.S. PATENT DOCUMENTS

| | | |
|---|---|---|
| 10,158,102 B2 | 12/2018 | Wu |
| 10,186,094 B2 | 1/2019 | Wu |
| 10,209,090 B2 | 2/2019 | Luke |
| 10,345,843 B2 | 7/2019 | Luke |
| 2013/0026971 A1 | 1/2013 | Luke |
| 2013/0030580 A1 | 1/2013 | Luke |
| 2013/0030581 A1 | 1/2013 | Luke |
| 2013/0030608 A1 | 1/2013 | Taylor |
| 2013/0030630 A1 | 1/2013 | Luke |
| 2013/0030920 A1 | 1/2013 | Wu |
| 2013/0033203 A1 | 2/2013 | Luke |
| 2013/0057212 A1* | 3/2013 | Feuell .................. H02J 7/0031 320/109 |
| 2013/0116892 A1 | 5/2013 | Wu |
| 2013/0262002 A1* | 10/2013 | Braun ..................... H04Q 9/00 702/63 |
| 2014/0142786 A1 | 5/2014 | Huang |
| 2014/0251710 A1 | 9/2014 | Juan |
| 2014/0253021 A1 | 9/2014 | Luke |
| 2014/0266006 A1 | 9/2014 | Luke |
| 2014/0277844 A1 | 9/2014 | Luke |
| 2014/0279576 A1 | 9/2014 | Luke |
| 2015/0042157 A1 | 2/2015 | Chen |
| 2016/0200214 A1* | 7/2016 | Ishibashi ................ B60L 58/20 180/65.1 |
| 2016/0267579 A1 | 9/2016 | Toya |
| 2017/0366019 A1* | 12/2017 | Sung ....................... B60L 58/22 |

FOREIGN PATENT DOCUMENTS

| | | |
|---|---|---|
| JP | 2001057711 A | 2/2000 |
| JP | 2003007348 A | 1/2003 |
| JP | 2010191636 A | 9/2010 |
| JP | 2012027594 A | 2/2012 |
| JP | 2013037637 A | 2/2013 |
| JP | 2014525229 A | 9/2014 |
| JP | 2014525230 A | 9/2014 |
| JP | 2014525231 A | 9/2014 |
| JP | 2014527390 A | 10/2014 |
| JP | 2014527689 A | 10/2014 |
| JP | 2014529117 A | 10/2014 |
| JP | 2014529118 A | 10/2014 |
| JP | 2014529119 A | 10/2014 |
| JP | 2014529392 A | 11/2014 |
| JP | 2014529982 A | 11/2014 |
| JP | 2014531699 A | 11/2014 |
| JP | 2014533480 A | 12/2014 |
| JP | 2015502881 A | 1/2015 |
| JP | 2015231837 A | 12/2015 |
| JP | 2015534927 A | 12/2015 |
| JP | 2016514357 A | 5/2016 |
| JP | 2016515063 A | 5/2016 |
| JP | 2016517257 A | 6/2016 |
| JP | 2016521389 A | 7/2016 |
| JP | 2016521393 A | 7/2016 |
| JP | 2016170771 A | 9/2016 |
| JP | 2016527871 A | 9/2016 |
| JP | 2016533154 A | 10/2016 |
| JP | 2016534518 A | 11/2016 |

OTHER PUBLICATIONS

Decision to Grant a Patent issued for counterpart Japanese Application No. 2017-057892, drafted by the Japan Paten Office dated Jun. 7, 2018.

Office Action issued for counterpart Japanese Application No. 2017-057892, drafted by the Japan Patent Office dated Feb. 22, 2018.

* cited by examiner

| USER IDENTIFYING INFORMATION | ELECTRIC-MOTORCYCLE ID | USER INFORMATION |
|---|---|---|
| A1 | B1 | U1 |
| A2 | B2 | U2 |
| ⋮ | ⋮ | ⋮ |

*FIG. 4*

MANAGEMENT DEVICE, MANAGEMENT SYSTEM, AND COMPUTER-READABLE STORAGE MEDIUM

The contents of the following Japanese patent application and international application are incorporated herein by reference:

Japanese Application No. 2017-057892 filed on Mar. 23, 2017, and

International Application No. PCT/JP2018/011642 filed on Mar. 23, 2018.

BACKGROUND

1. Technical Field

The present invention relates to a management device, a management system, and a computer-readable storage medium.

2. Related Art

An energy supplying station is known that has a function that stores a group of batteries fully charged (refer to Patent Literature 1).

CITATION LIST

Patent Literature

[Patent Literature 1] Japanese Patent Application Publication No. 2001-57711

BRIEF DESCRIPTION OF THE DRAWINGS

FIG. 4 illustrates in a table an example of information a storage portion 140 of a management server 102 stores.

DESCRIPTION OF EXEMPLARY EMBODIMENTS

Figure 1:
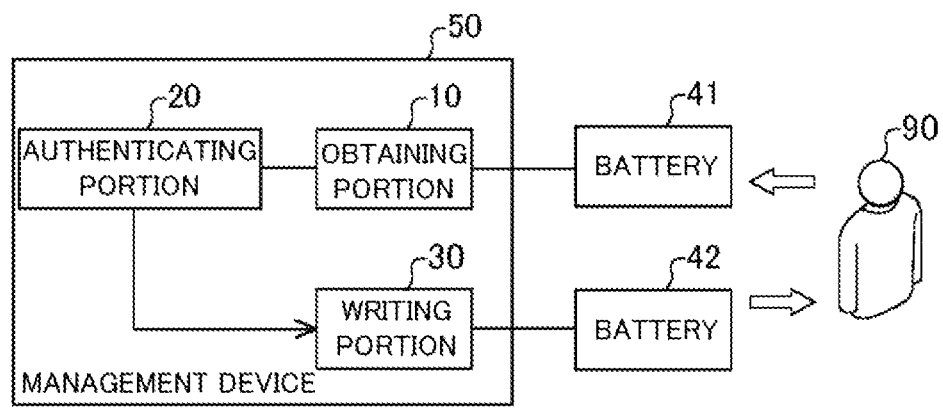
FIG. 1 schematically illustrates an example of system configurations of a management device 50.

Hereinafter, the present invention is described with reference to an embodiment of the invention. However, the embodiment described below does not limit the invention related to the claims. All combinations of characteristics described in the embodiment are not necessarily essential to solution of the invention. The same reference numerals are assigned to the same or similar portions in the drawings, and repeated descriptions may be omitted.

FIG. 1 schematically illustrates an example of system configurations of a management device 50. The management device 50 is a management device that manages batteries. The management device 50 receives a battery 41 and supplies a battery 42. More specifically, the management device 50 receives the battery 41 from a user 90, and supplies the battery 42 to the user 90.

The battery 41 and the battery 42 are secondary batteries, such as lithium-ion batteries, nickel-hydrogen batteries, and lead-acid batteries. The battery 41 and the battery 42 are attachable to and detachable from the management device 50. For example, the battery 41 is a battery that has been used. For example, the battery 42 is a battery that has been charged.

The management device 50 includes an obtaining portion 10, an authenticating portion 20, and a writing portion 30. The obtaining portion 10 obtains, from the battery 41, first identification information stored in the battery 41. The authenticating portion 20 authenticates the user 90 of the battery 41 by using the first identification information the obtaining portion 10 has obtained. If the authenticating portion 20 authenticates the user 90, the writing portion 30 writes the first identification information to the battery 42 that is to be supplied to the user 90.

The management device 50 can write, to the battery 42 that is to be supplied to the user 90, identification information that is the same as identification information that is stored in the battery 41 that has been used the management device 50 has received from the user 90. Therefore, particular identification information is always written to a battery that is to be supplied to the user 90. Therefore, the user 90 is identified and the user 90 is authenticated by obtaining identification information from a battery received from the user 90.

The management device 50 allows the user 90 not to use a user card of the management device or a user terminal to perform authentication operation. For example, the user 90 performs authentication of the user 90 by bringing the battery 41 to the management device 50 and attaching the battery 41 to the management device 50. Therefore, the user 90 does not need to use a user card or a user terminal while having the battery 41. Consequently, the management device 50 significantly reduces labor of replacement of batteries by the user 90.

The portions of the management device 50 may be implemented by hardware, may be implemented by software, or may be implemented by hardware and software. If at least part of constituent elements that constitute the management device 50 are implemented by software, the constituent elements implemented by the software may be implemented by software or program that defines operation related to the constituent elements and is run by an information processing device that has a general configuration. The above information processing device may include (i) a data processing device that includes processors, such as a central processing unit (CPU) and a graphics processing unit (GPU), a read-only memory (ROM), a random-access memory (RAM), and a communication interface, (ii) input devices, such as a keyboard, a touch screen, a camera, a microphone, various sensors, and a global positioning system (GPS) receiver, (iii) output devices, such as a display, a speaker, and a vibrator, and (iv) storage devices (that include an external storage device), such as a memory and a hard disk drive (HDD). In the above information processing device, the above data processing device or storage devices may store the above software or program. The above software or program run by a processor allows the above information processing device to execute operation defined by the software or program. The above software or program may be stored in a non-transitory computer-readable storage medium.

The above software or program may be program that controls the management device 50. For example, the above program allows a computer to execute an obtaining procedure that obtains, from the battery 41, first identification information stored in the battery 41, an authenticating procedure that authenticates the user 90 of the battery 41 by using the first identification information obtained by the obtaining procedure, and a writing procedure that writes the first identification information to the battery 42 that is to be supplied to the user 90 if the user 90 is authenticated by the authenticating procedure. The above computer may function as the management device 50. The above computer may be a processing device, such as a processor, that executes functions of the management device 50.

Figure 2:
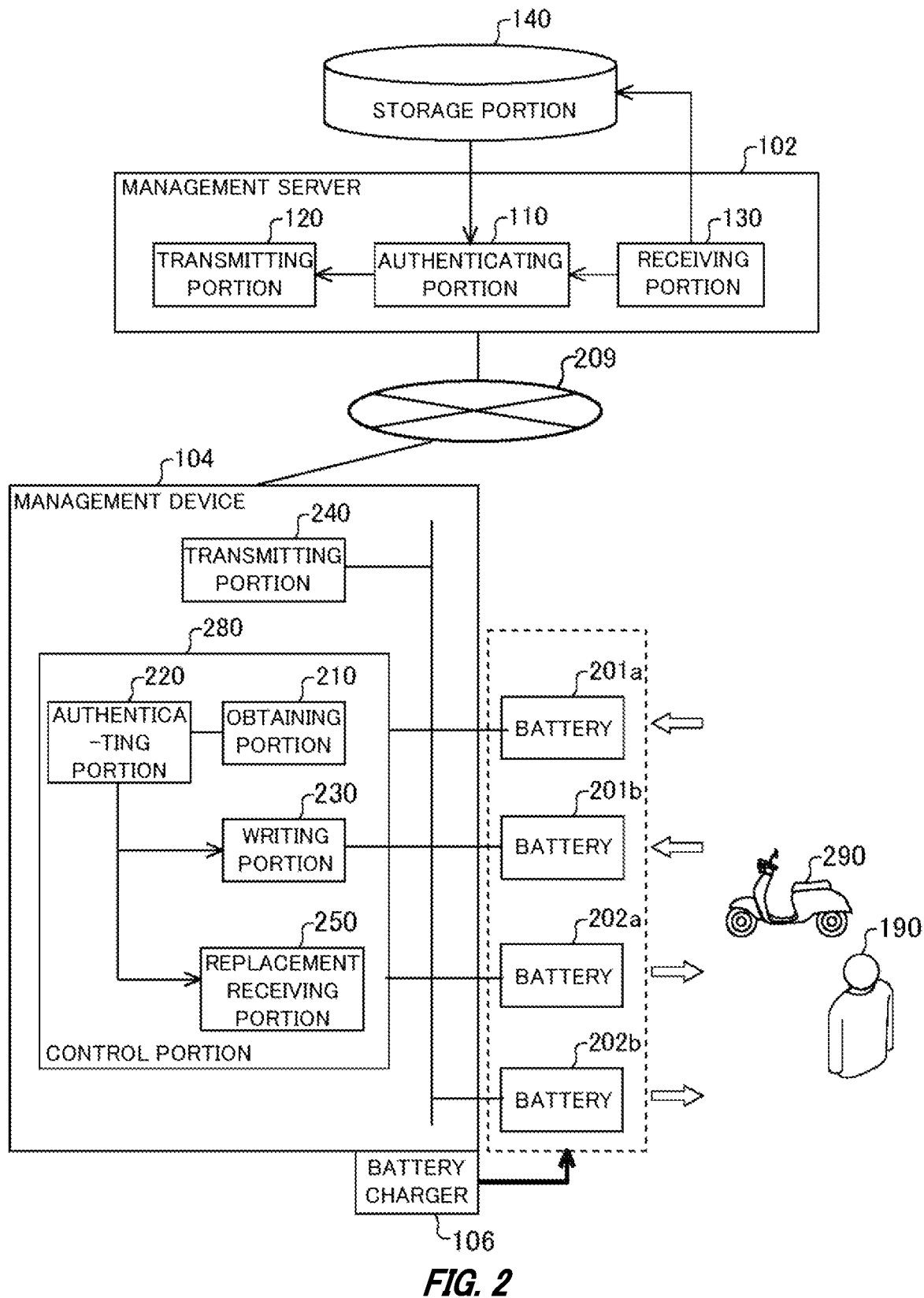
FIG. 2 schematically illustrates an example of whole configurations of a management system 100.

FIG. 2 schematically illustrates an example of whole configurations of a management system 100. The management system 100 is outlined with reference to FIG. 2. The management system 100 includes a management server 102, a management device 104, and a battery charger 106.

The management device 104 manages a battery 201*a*, a battery 201*b*, a battery 202*a*, and a battery 202*b*. The battery 201*a*, the battery 201*b*, the battery 202*a*, and the battery 202*b* are secondary batteries, such as lithium-ion batteries, nickel-hydrogen batteries, and lead-acid batteries. The battery 201*a*, the battery 201*b*, the battery 202*a*, and the battery 202*b* are attachable to and detachable from the management device 104. When the battery 201*a*, the battery 201*b*, the battery 202*a*, and the battery 202*b* are attached to the management device 104, the battery 201*a*, the battery 201*b*, the battery 202*a*, and the battery 202*b* are attached to the battery charger 106.

The battery charger 106 uses electrical energy supplied from an external power supply to charge the battery 202*a*, the battery 202*b*, a battery 201*a*, and a battery 201*b*. The external power supply may include an electrical grid or an electric generator, for example. The electric generator may include a natural-energy electric generator.

The battery 201*a* and the battery 201*b* are batteries that have been used. The battery 201*a* and the battery 201*b* may be collectively referred to as the batteries 201. The battery 202*a* and the battery 202*b* are batteries that have been charged. The battery 202*a* and the battery 202*b* may be collectively referred to as the batteries 202. The batteries 201 and the batteries 202 may be collectively referred to as the "batteries" if the batteries 201 and the batteries 202 do not need to be particularly discriminated.

An electric motorcycle 290 operates by electrical energy of the battery 201*a* and the battery 201*b*. The electric motorcycle 290 operates by electrical energy of the battery 202*a* and the battery 202*b*. In the present embodiment, the electric motorcycle 290 operates by electrical energy of two batteries. If the electric motorcycle 290 uses two or more batteries, it is demanded to appropriately manage the plurality of batteries.

The batteries attached to the electric motorcycle 290 supply electrical energy to the electric motorcycle 290. The electric motorcycle 290 runs by converting electrical energy supplied from the batteries into power. The electric motorcycle 290 may use electrical energy supplied from the batteries to operate electrical equipment of the electric motorcycle. The electric motorcycle 290 is an example of vehicles. The vehicles may include electric bicycles, motorcycles, and automobiles. The vehicles may include electric automobiles. The vehicles are an example of transportation equipment. The transportation equipment is an example of movable objects.

The management device 104 communicates with the management server 102 through a communication network 209. The management device 104 constitutes at least part of a battery station that supplies batteries for replacement for the electric motorcycle 290. The management device 104 controls charging of batteries to allow batteries that have been charged to be always supplied.

The communication network 209 may include transmission channels of wired communication, and may include transmission channels of wireless communication. The communication network 209 may include a packet-radio network, the Internet, a peer-to-peer (P2P) network, a private line, a virtual private network (VPN), and power-line communication. The communication network 209 may include (i) a mobile communication network, such as a mobile-phone line network, and may include (ii) wireless communication networks, such as wireless metropolitan area network (Wireless MAN) (e.g. worldwide interoperability for microwave access (WiMAX (registered trademark)), a wireless local area network (wireless LAN) (e.g. Wi-Fi (registered trademark)), Bluetooth (registered trademark), Zigbee (registered trademark), and near field communication (NFC).

Operation of the management system 100 is outlined. A user 190 attaches, to the management device 104, the batteries 201 that have been used and have been detached from the electric motorcycle 290. The management device 104 reads authentication information from the batteries 201 that have been attached. The management device 104 authenticates the user 190 by transmitting the authentication information to the management server 102. After the user 190 is authenticated, the user 190 detaches, from the management device 104, the batteries 202 that have been charged, and attaches the batteries 202 to the electric motorcycle 290. If the batteries 202 are detached from the management device 104, the management device 104 asks the management server 102 for billing. The management device 104 appropriately charges the batteries 201 that have been attached.

As illustrated in FIG. 2, the management device 104 includes a control portion 280, and a transmitting portion 240. The control portion 280 includes an obtaining portion 210, an authenticating portion 220, a writing portion 230, and a replacement receiving portion 250.

The management device 104 is a management device that manages the batteries. The management device 104 receives the batteries 201 and supplies the batteries 202.

The obtaining portion 210 obtains, from the batteries 201, first identification information stored in the batteries 201. The authenticating portion 220 authenticates a user of the batteries 201 by using the first identification information the obtaining portion 210 has obtained. If the authenticating portion 220 authenticates the user, the writing portion 230 writes the first identification information to the batteries 202 that is to be supplied to the user. Consequently, the first identification information is written to the batteries that is to be supplied to the user 190, and the user 190 is identified and authenticated based on the first identification information.

The first identification information is information for identifying the user 190. The first identification information may be any information as long as the first identification information is information that allows the user 190 to be identified, for example. The first identification information may be information particular to the user 190. The first identification information may be information assigned to the user 190. If the user 190 purchases the electric motorcycle 290, the user 190 may access the management server 102 at a shop that sells the electric motorcycle 290, for example, first identification information may be assigned to the user 190, and the management server 102 may associate the user 190 with the first identification information.

The batteries 201 store specific information that specifies second identification information that is identification information of the electric motorcycle 290 that has used the batteries 201. The obtaining portion 210 further obtains the specific information from the batteries 201. The authenticating portion 220 authenticates the user of the batteries 201 by using the first identification information and the specific information obtained from the batteries. The specific information may be identification information itself of the electric motorcycle 290. The specific information may be information obtained by converting identification information of the electric motorcycle 290 according to a predetermined process.

When the batteries 201 are attached to the electric motorcycle 290, the electric motorcycle 290 writes, to the batteries 201, specific information that specifies identification information of the electric motorcycle 290.

The management server 102 stores user information in association with the first identification information. The authenticating portion 220 transmits the first identification information to the management server 102, and obtains, from the management server 102, a result of authentication of the user 190.

If the management server 102 stores user information in association with the first identification information the management server 102 has received from the management device 104, the management server 102 determines that the user 190 is valid. If the management server 102 does not store user information in association with the first identification information the management server 102 has received from the management device 104, the management server 102 determines that the user 190 is not valid. If the management server 102 does not store user information in association with the first identification information the management server 102 has received from the management device 104, the management server 102 notifies a user identified based on user information stored in association with the first identification information.

For example, the management server 102 stores user information in association with a combination of first identification information and second identification information. The authenticating portion 220 transmits first identification information and specific information to the management server 102, and obtains, from the management server 102, a result of authentication of a user.

If the management server 102 stores user information in association with a combination of the first identification information the management server 102 has received from the management device 104 and the second identification information specified by the specific information, the management server 102 determines that a user is valid. If the management server 102 does not store user information in association with the above combination, the management server 102 determines that a user is not valid. If the management server 102 does not store user information in association with the above combination, the management server 102 notifies a user identified based on user information stored in association with the first identification information.

More specifically, a storage portion 140 of the management server 102 stores user information in association with the first identification information. Alternatively, the storage portion 140 of the management server 102 stores user information in association with a combination of the first identification information and the second identification information. A receiving portion 130 of the management server 102 receives the first identification information transmitted by the transmitting portion 240 of the management device 104. More specifically, the receiving portion 130 receives the first identification information and the specific information transmitted by the transmitting portion 240 of the management device 104. If user information is stored in association with a combination of the first identification information the receiving portion 130 has received and the second identification information specified by the specific information, the authenticating portion 110 determines that a user is valid. On the other hand, if the authenticating portion 110 determines that user information is not stored in association with the above combination, the transmitting portion 120 notifies a user identified based on user information stored in association with the first identification information. The transmitting portion 120 may notify the user of a warning by means of an electronic mail, for example. Consequently, the user 190 is notified that the batteries 201 may have been stolen from the electric motorcycle 290.

The management system 100 manages the batteries by means of a combination of the first identification information and the identification information of the electric motorcycle 290. Consequently, a risk that occurs if the batteries are stolen from the electric motorcycle 290 and are used for another electric motorcycle is reduced. For example, if the batteries are stolen and used for another electric motorcycle, specific information that corresponds to identification information of another electric motorcycle is written to the batteries. Therefore, a combination stored in the batteries is different from a combination of identification information of the user 190 and the electric motorcycle 290. Therefore, if the batteries are brought to the management device 104, the management server 102 detects illegal usage of the batteries.

The electric motorcycle 290 uses a plurality of batteries. A plurality of pieces of information may be generated from identification information of the electric motorcycle 290 that has used a plurality of batteries. The plurality of pieces of information as specific information may be dispersedly written to the plurality of batteries, respectively.

More specifically, the electric motorcycle 290 uses the battery 201a and the battery 201b, as described above. If the battery 201a and the battery 201b are attached to the electric motorcycle 290, the electric motorcycle 290 divides the identification information of the electric motorcycle 290 into pieces of the identification information of the electric motorcycle 290, and writes dispersedly the pieces of the identification information of the electric motorcycle 290 to the battery 201a and the battery 201b.

For example, if the identification information of the electric motorcycle 290 is "AABB", "0AA" that is a first half "AA" of the "AABB" to which a prefix "0" that means a first half is added is written to the battery 201a. The electric motorcycle 290 also writes, to the battery 201b, "1BB" that is a second half "BB" of the "AABB" to which a prefix "1" that means a second half is added. If the management server 102 receives "0AA" and "1BB", the management server 102 determines that the identification information of the electric motorcycle 290 is "AABB". Consequently, if a combination of batteries that is different from a combination of the batteries 201 that have been supplied to the electric motorcycle 290 are brought to the management device 104, the fact is appropriately detected. For example, a fact is detected that one of the battery 201a and the battery 201b that have been supplied has been used for another motorcycle.

The management device 104 identifies the user 190 by using batteries the electric motorcycle 290 uses. Therefore, the user 190 is authenticated without extra labor. If a method in which identification information of the electric motorcycle 290 is also used for authentication is adopted, batteries are appropriately managed according to a combination of the user 190 and the electric motorcycle 290.

At least part of constituent elements that constitute the management device 104 may be implemented by software, similarly as the management device 50. For example, the control portion 280 may be a processing device, such as a processor, in an information processing device, such as a computer, and at least part of constituent elements that constitute the management device 104 may be implemented by software or program run by the information processing device.

Figure 3:
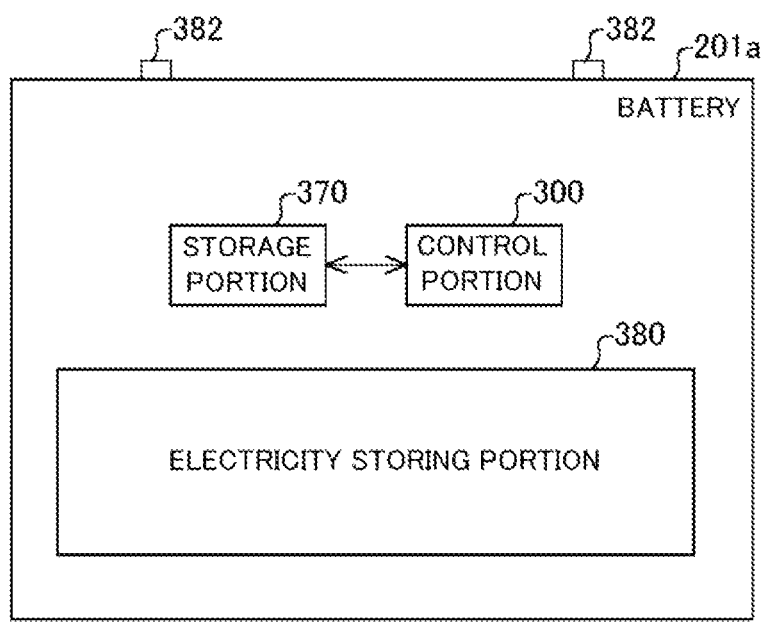
FIG. 3 schematically illustrates an internal configuration of a battery 201.

FIG. 3 schematically illustrates an internal configuration of the battery 201a. The battery 201a includes a control portion 300, a storage portion 370, an electricity storing portion 380, and terminals 382.

The storage portion 370 stores information used for operation of the control portion 300. The storage portion 370 may include a non-transitory storage medium. The storage portion 370 stores first identification information. The storage portion 370 stores specific information that specifies identification information of the electric motorcycle 290.

The control portion 300 controls the portions of the battery 201a. The control portion 300 controls the portions of the battery 201a, based on information stored in the storage portion 370.

If the battery 201a is attached to the electric motorcycle 290, the control portion 300 communicates with the electric motorcycle 290 to obtain specific information from the electric motorcycle 290. The specific information specifies identification information of the electric motorcycle 290. The control portion 300 writes the obtained specific information to the storage portion 370. If the battery 201a is attached to the management device 104, the control portion 300 transmits, to the management device 104 in response to request from the management device 104, the first identification information and the specific information that have been stored in the storage portion 370. If the battery 201a is supplied to the user 190, the control portion 300 obtains first identification information from the management device 104, and writes the first identification information to the storage portion 370. The control portion 300 may communicate with the electric motorcycle 290 and the management device 104 through power-line communication through the terminals 382.

The electricity storing portion 380 stores electrical energy supplied from the battery charger 106, for example, through the terminals 382. When the battery 201a is attached to the electric motorcycle 290, electrical energy stored in the electricity storing portion 380 can be supplied to the electric motorcycle 290 through the terminals 382.

An example of internal configurations of the battery 201a has been described with reference to FIG. 3. The battery 201b, the battery 202a, and the battery 202b each have an internal configuration the same as the internal configuration of the battery 201a. Therefore, an internal configuration of each of the battery 201b, the battery 202a, and the battery 202b will not be described.

FIG. 4 illustrates in a table an example of information the storage portion 140 of the management server 102 stores. The storage portion 140 stores user information in association with user identifying information and electric-motorcycle ID.

The "user identifying information" is information that identifies a user. In the present embodiment, the "user identifying information" is "first identification information". In the present embodiment, the "electric-motorcycle ID" is identification information of the electric motorcycle 290. For example, identification information of the electric motorcycle 290 may be "AABB" described above.

The "user information" is information on a user. The "user information" may include identification information of a user. The "user information" may include information on billing for a user, and information on a contract with a user, for example.

The authenticating portion 110 authenticates a user by using information stored in the storage portion 140, and information the receiving portion 130 has received. For example, if the receiving portion 130 receives "A1" as user identifying information, and receives "B1" as identification information of the electric motorcycle 290, the authenticating portion 110 determines that a user of the management device 104 is a valid user since user information "U1" is stored in the storage portion 140 in association with "A1" and "B1". That is, the user is authenticated. In that case, the transmitting portion 120 transmits, to the management device 104, a message to effect that the user has been authenticated.

On the other hand, if the receiving portion 130 receives "A1" as user identifying information, and receives "B2" as identification information of the electric motorcycle 290, the authenticating portion 110 determines that a user of the management device 104 is not a valid user since user information associated with "A1" and "B2" is not stored in the storage portion 140. That is, the authenticating portion 110 determines that the user is not authenticated. In that case, the transmitting portion 120 transmits, to the management device 104, a message to effect that the user has not been authenticated. The transmitting portion 120 may also transmit a warning to a user identified with "A1".

In that way, the management server 102 associates the "user identifying information" with the "electric-motorcycle ID", and manages the "user identifying information" and the "electric-motorcycle ID". Consequently, it is more appropriately determined whether the user 190 who uses the management device 104 and the electric motorcycle 290 are a valid combination.

Figure 5:
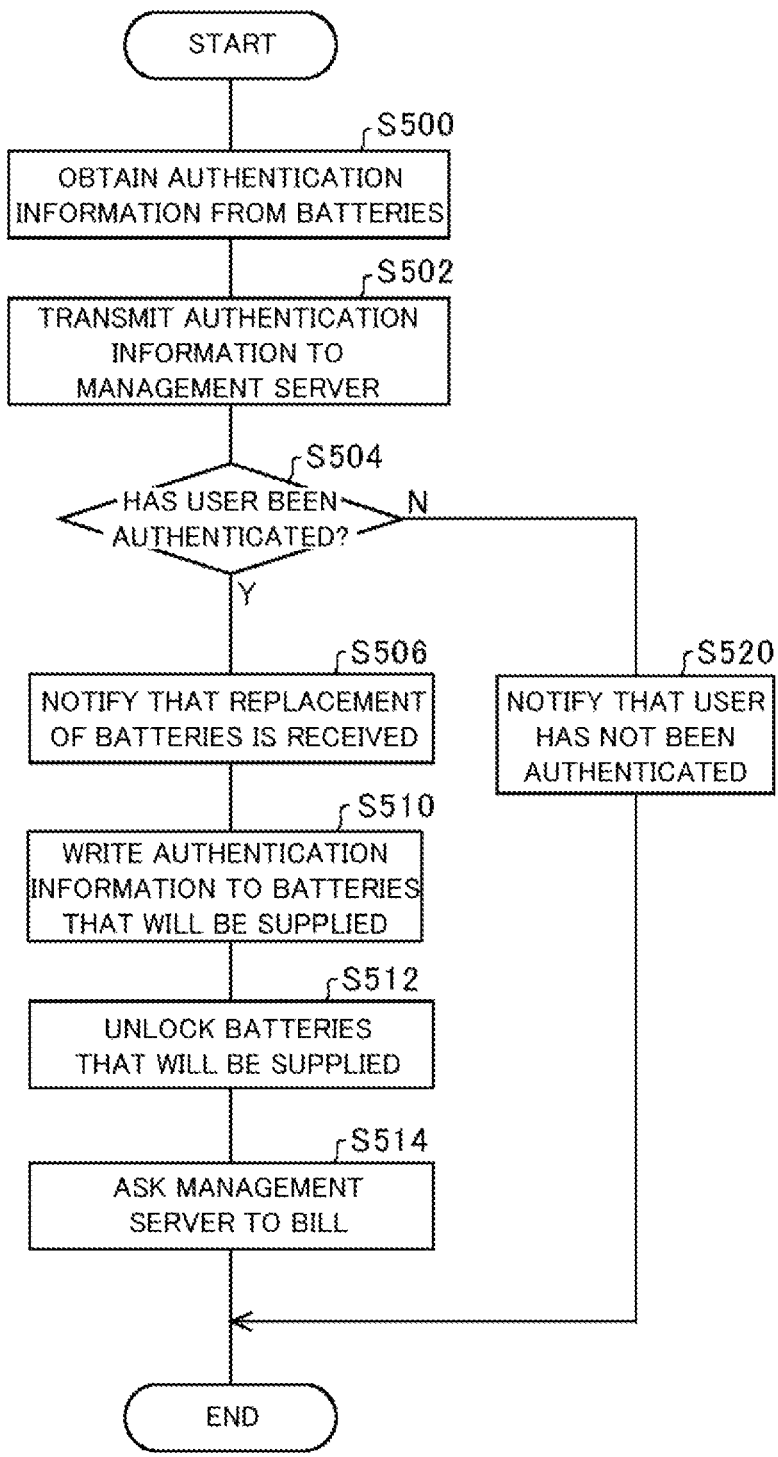
FIG. 5 is a flowchart that illustrates a process related to replacement of batteries at a management device 104.

FIG. 5 is a flowchart that illustrates a process related to replacement of batteries at the management device 104. The process of the present flowchart is started when the batteries 201 are attached to the management device 104.

In S500, the obtaining portion 210 reads authentication information from the batteries 201. For example, the authentication information may include "user identifying information". The authentication information may be "user identifying information" and "electric-motorcycle ID". The authentication information may be "user identifying information" and specific information that specifies "electric-motorcycle ID".

In S502, the authenticating portion 220 transmits authentication information to the management server 102 through the transmitting portion 240.

In S504, the authenticating portion 220 determines whether or not a user has been authenticated. If a message to effect that the user has not been authenticated is received from the management server 102, the control portion 280 notifies the user 190 of an authentication error in S520. The control portion 280 may notify the user of the result of the authentication by blinking a notification lamp of the management device 104 in a predetermined pattern.

If a message to effect that the user has been authenticated is received from the management server 102, the replacement receiving portion 250 may select batteries 202 that is to be supplied to the user 190, and may notify the user that the replacement of the batteries is received in S506. For example, if a signal to effect that the user has been authenticated is received, the control portion 280 may light the notification lamp of the management device 104 to notify the user of the result of the authentication.

In S510, the writing portion 230 writes authentication information to the storage portion 370 of the batteries 202 that is to be supplied. In S512, the control portion 280 unlocks accommodated portions of the batteries 202 that is to be supplied. In S514, the transmitting portion 240 notifies the management server 102 through the communication network 209 that the management server 102 is asked to bill.

Figure 6:
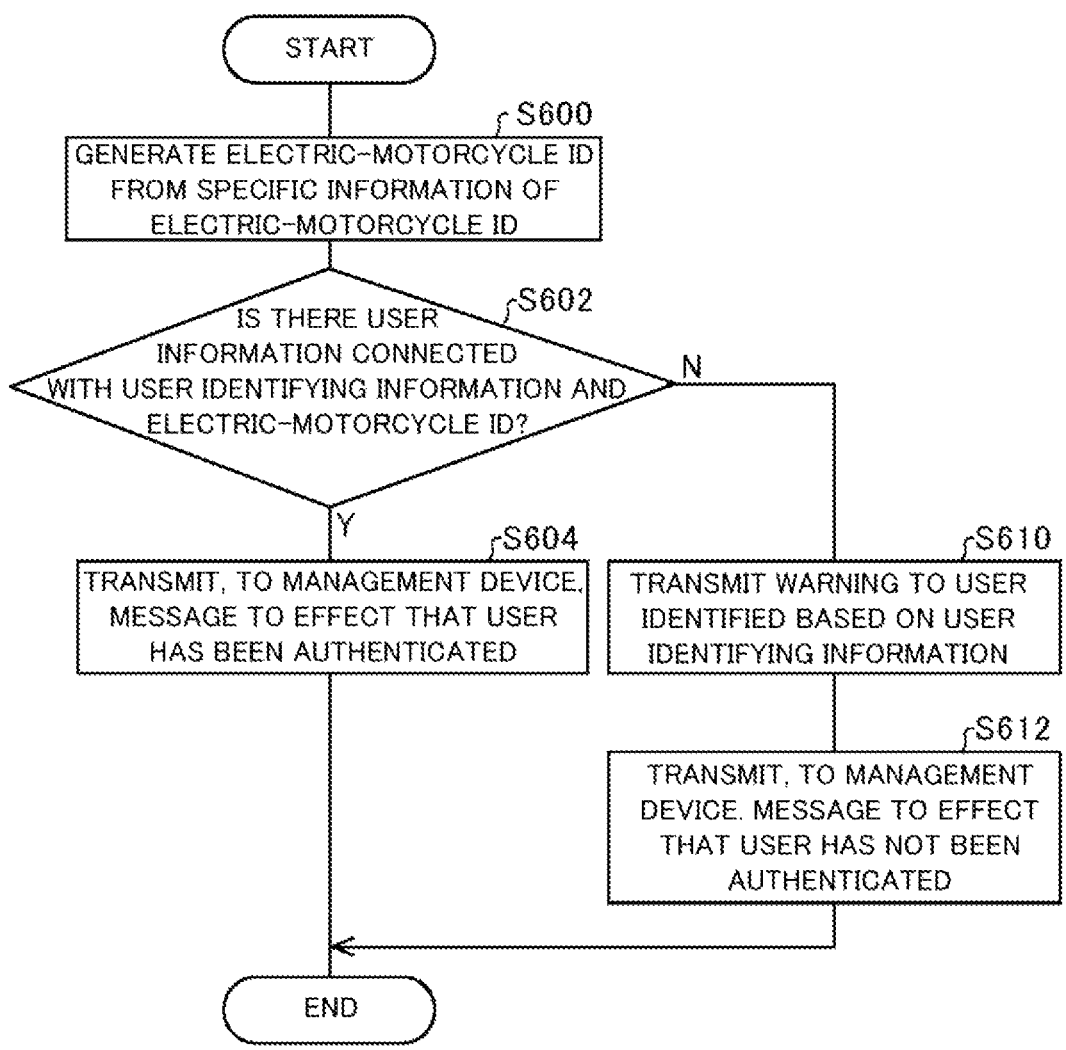
FIG. 6 illustrates authentication operation of the management server 102.

FIG. 6 illustrates authentication operation of the management server 102. A process of the present flowchart is started when the receiving portion 130 receives authentication information.

In S600, the authenticating portion 110 generates electric-motorcycle ID from specific information of the electric-motorcycle ID included in the authentication information. For example, electric-motorcycle ID "AABB" is generated from "0AA" and "1BB", as described above.

In S602, the authenticating portion 110 determines whether or not the storage portion 140 stores user information associated with user identifying information included in the authentication information and the electric-motorcycle ID. If the storage portion 140 stores user information associated with the user identifying information and the electric-motorcycle ID, the transmitting portion 120 transmits, to the management device 104, a message to effect that the user has been authenticated in S604.

If the storage portion 140 does not store user information associated with the user identifying information and the electric-motorcycle ID in S602, a warning is transmitted to a user identified based on the user identifying information in S610. Consequently, the user 190 is notified that the batteries may have been stolen from the electric motorcycle 290. In S612, the transmitting portion 120 transmits, to the management device 104, a message to effect that the user has not been authenticated.

In descriptions of FIGS. 4 to 6, a case in which a user is authenticated with a combination of user identifying information and electric-motorcycle ID is mainly described. However, a method may be adopted in which a user is not authenticated with a combination of user identifying information and electric-motorcycle ID. For example, only user identifying information may be used as authentication information of a user. The authentication method is applicable to authentication of users of electric motorcycles in a sharing system.

As described above, the management device 104 identifies the user 190 by using the batteries of the electric motorcycle 290. Therefore, the user 190 is authenticated without extra labor.

Objects managed by the above management system 100 are not limited to the batteries of the electric motorcycle 290. Objects managed by the management system 100 are applicable to management of other various batteries. Objects managed by the management system 100 are not limited to management of batteries. A method using which user authentication and a replaceable member are managed based on information stored in the replaceable member, such as the management device 104, is applicable to various replaceable members, in addition to batteries.

The present invention has been described with reference to the embodiment. However, a technical scope of the present invention is not limited to a scope of the above embodiment. It is obvious to a person skilled in the art to variously vary or modify the above embodiment. Particulars described in a particular embodiment is applicable to another embodiment unless the application causes technical contradiction. The claims clearly disclose that such variations and modifications are included in a technical scope of the present invention.

Note that actions, such as operation, procedures, steps, and stages, in the devices, the systems, the program, and the methods disclosed in the claims, the description, and the drawings are performed in any order unless "before", "in advance", and the like are clearly expressed, or unless output of a preceding action is used in a later action. Even if "First,", "Next,", and the like are used for convenience in descriptions of operational flow in the claims, the description, and the drawings, "First,", "Next,", and the like do not mean that the order is essential.

REFERENCE SIGNS LIST

10 Obtaining portion
20 Authenticating portion
30 Writing portion
41 Battery
42 Battery
50 Management device
90 User
100 Management system
106 Battery charger
102 Management server
104 Management device
130 Receiving portion
140 Storage portion
110 Authenticating portion
120 Transmitting portion
190 User
201 Battery
202 Battery
209 Communication network
210 Obtaining portion
220 Authenticating portion
230 Writing portion
240 Transmitting portion
250 Replacement receiving portion
280 Control portion
290 Electric motorcycle
300 Control portion
370 Storage portion
380 Electricity storing portion
382 Terminal

What is claimed is:

1. A management device that: manages batteries; receives a first battery in which specific information is stored that specifies second identification information that is identification information of a vehicle that has used the first battery; and supplies a second battery, the management device comprising:
an obtaining portion that obtains, from the first battery, first identification information stored in the first battery and the specific information;
an authenticating portion that authenticates a user of the first battery by using the first identification information and the specific information the obtaining portion has obtained; and a writing portion that, if the authenticating portion authenticates the user, writes the first identification information to the second battery that is to be supplied to the user.

2. The management device according to claim 1, wherein the authenticating portion transmits the first identification information and the specific information to a management server that stores user information in association with the first identification information, and obtains, from the management server, a result of authentication of the user.

3. The management device according to claim 2, wherein the management server stores user information in association with a combination of the first identification information and the second identification information, and if user information is stored in association with a combination of the first identification information the management server has received from the management device and the second identification information specified by the specific information, the management server determines that the user is valid.

4. The management device according to claim 3, wherein if the management server does not store user information in association with the combination, the management server notifies a user identified based on the user information stored in association with the first identification information.

5. The management device according to claim 1, wherein the vehicle uses a plurality of batteries, and a plurality of pieces of information generated from identification information of the vehicle that has used the plurality of batteries is dispersedly stored as the specific information in the plurality of batteries.

6. A management system comprising:
the management device according to claim 2; and
the management server.

7. A non-transitory computer-readable storage medium that stores a program of a management device that: manages batteries; receives a first battery; and supplies a second battery, wherein
the first battery stores specific information that specifies second identification information that is identification information of a vehicle that has used the first battery, and the program allows a computer to execute:
an obtaining procedure that obtains, from the first battery, first identification information and the specific information stored in the first battery;
an authenticating procedure that authenticates a user of the first battery by using the first identification information and the specific information obtained by the obtaining procedure, and
a writing procedure that writes the first identification information to the second battery that is to be supplied to the user if the user is authenticated by the authenticating procedure.

* * * * *